United States Patent [19]

Aramaki

[11] Patent Number: 4,974,572
[45] Date of Patent: Dec. 4, 1990

[54] APPARATUS FOR AND METHOD OF DIAGNOSING EXHAUST GAS RECIRCULATION SYSTEM

[75] Inventor: Takashi Aramaki, Yokohama, Japan
[73] Assignee: Nissan Motor Company, Ltd., Japan
[21] Appl. No.: 327,551
[22] Filed: Mar. 23, 1989
[30] Foreign Application Priority Data
Mar. 25, 1988 [JP] Japan .............................. 63-39836[U]
[51] Int. Cl.⁵ ............................................. F02B 47/08
[52] U.S. Cl. .................................................... 123/571
[58] Field of Search .................... 60/274, 278; 123/571
[56] References Cited

U.S. PATENT DOCUMENTS 4,793,318 12/1988 Tsurusaki ............................ 123/571
4,834,054 5/1989 Hashimoto .......................... 123/571

FOREIGN PATENT DOCUMENTS 51-94025 8/1976 Japan .

*Primary Examiner*—Douglas Hart
*Attorney, Agent, or Firm*—Lowe, Price, LeBlanc, Becker & Shur

[57] ABSTRACT

An apparatus for and a method of diagnosing an EGR system are disclosed. A temperature within an EGR passage and a rise in temperature within the EGR passage are detected or determined by calculation. When the temperature and the temperature rise are lower than predetermined values, respectively, when the engine running condition falls in a predetermined range (a diagnosis area), it is determined that the EGR system is in trouble.

2 Claims, 3 Drawing Sheets

APPARATUS FOR AND METHOD OF DIAGNOSING EXHAUST GAS RECIRCULATION SYSTEM

BACKGROUND OF THE INVENTION

The present invention relates to an apparatus for and a method of diagnosing an exhaust gas recirculation (EGR) system for an internal combustion engine of a motor vehicle.

The EGR systems usually have an exhaust gas recirculation (EGR) passage with an exhaust gas recirculation (EGR) control valve. A portion of exhaust gas discharged from an internal combustion engine through an exhaust system is admitted into the EGR passage and recirculated under the control of the EGR control valve to an intake system of the engine, suppressing the maximum combustion temperature within the engine, resulting in a reduction in production of NOx within the engine. This portion of exhaust gas may be referred to as an EGR gas. However, if an amount of EGR gas is too abundant, the combustion within the engine is deteriorated, degrading stability of the engine operation, resulting in a reduction in output of the engine. The amount or flow rate of EGR gas should be determined in coordination with an air-fuel ratio and an ignition timing. Accordingly, a control unit is provided to control the amount of EGR gas with an air-fuel ratio control and an ignition timing control in accordance with running conditions of the engine. In controlling the amount of EGR gas, it is important to know accurately the operating state of the EGR system for improving control precision of the EGR system and/or diagnosis thereof.

Japanese Preliminary Patent Publication No. 51-94025 discloses an apparatus includes a temperature sensor such as thermistor in an EGR passage and it judges whether the EGR system is in trouble or not in response to a change in temperature within the EGR passage. Specifically, a change in the temperature is used as the criteria in making a judgment whether the EGR gas is actually recirculated in engine running conditions where the EGR is demanded. If the presence of the EGR is not detected, the apparatus determines that the EGR system is in trouble and gives some alarm to a driver. Engine running conditions where a diagnosis of the EGR system is made, namely a diagnosis area, are defined in terms of a basic pulse width Tp of fuel injection pulse, which is determined in accordance with an intake air quantity and a number N of revolutions of the engine (i.e., engine speed).

Referring to FIG. 3, an area enclosed by a one-dot-chain line represents engine running conditions where the EGR is to be effected, while a shadowed area represents engine running conditions where diagnosis is made. This shadowed area is defined in terms of the basic pulse width Tp and the number N of revolutions of the engine. Assuming now that the engine running conditions shift from a point A to a point B, a temperature change within the EGR passage is large. However, on shifting from a point C to the point B, the temperature change is small because EGR has been already applied during operation at the point C. This means that a value of the temperature change used for the diagnosis has to be set small, so that a high precision is demanded on the apparatus for diagnosing the EGR system. In other words, if the diagnosing apparatus is not of high precision required, accurate diagnosis cannot be made.

Another known diagnosing apparatus is disclosed in Japanese Preliminary Patent Publication No. 60-21374, which includes a temperature sensor in an EGR passage and determines that the EGR system is in trouble when the detected temperature within the EGR passage is lower than a predetermined value.

With this known apparatus, whether or not the EGR system is in trouble is judged on the result of comparing the detected temperature with EGR passage and a predetermined value. Accordingly, under a condition where the atmospheric temperature is low as shown by a broken line drawn curve in FIG. 4, the diagnosing apparatus exhibits a poor response owing to a temperature drop of the EGR gas caused by the low atmospheric temperature. As a result, the rise in temperature of the EGR gas up to the predetermined value is considerably delayed. Thus, taking this situation into account, a long waiting time is set in this known diagnosing apparatus. Since the occurrence of fault or malfunction of the EGR system can not be detected during this waiting time, it is demanded that the waiting time be short.

An object of the present invention is to provide an apparatus for and a method of diagnosing an EGR system with a better accuracy.

SUMMARY OF THE INVENTION

According to one aspect of the present invention, there is provided an apparatus for diagnosing an EGR system for an internal combustion engine, the EGR system including an EGR passage, the apparatus comprising:

means for detecting whether running condition of the engine falls in a predetermined range of engine running conditions or not and generating a diagnosis area indicative signal when the running condition of the engine falls in said predetermined range;

means for detecting a temperature within the EGR passage and generating a temperature indicative signal indicative of the temperature detected;

means responsive to said temperature indicative signal for determining a rise in said temperature indicative signal and generating a temperature rise indicative signal indicative of the rise detected; and means for determining that the EGR system is in trouble when said temperature indicative signal is lower than a first predetermined value and said temperature rise indicative signal is lower than a second predetermined value under a condition where said diagnosis area indicative signal is present.

According to another aspect of the present invention, there is provided a method of diagnosing an EGR system for an internal combustion engine, the EGR system including an EGR passage, the method comprising the steps of:

detecting whether running condition of the engine falls in a predetermined range of engine running conditions or not and generating a diagnosis area indicative signal when the running condition of the engine falls in said predetermined range;

detecting a temperature within the EGR passage and generating a temperature indicative signal indicative of the temperature detected;

determining a rise in said temperature indicative signal and generating a temperature rise indicative signal indicative of the rise detected; and determining that the EGR system is in trouble when said temperature indicative signal is lower than a first predetermined value and said temperature rise indicative signal is lower than a second predetermined value under a condition where said diagnosis area indicative signal is present.

DETAILED DESCRIPTION OF THE INVENTION

Figure 1:
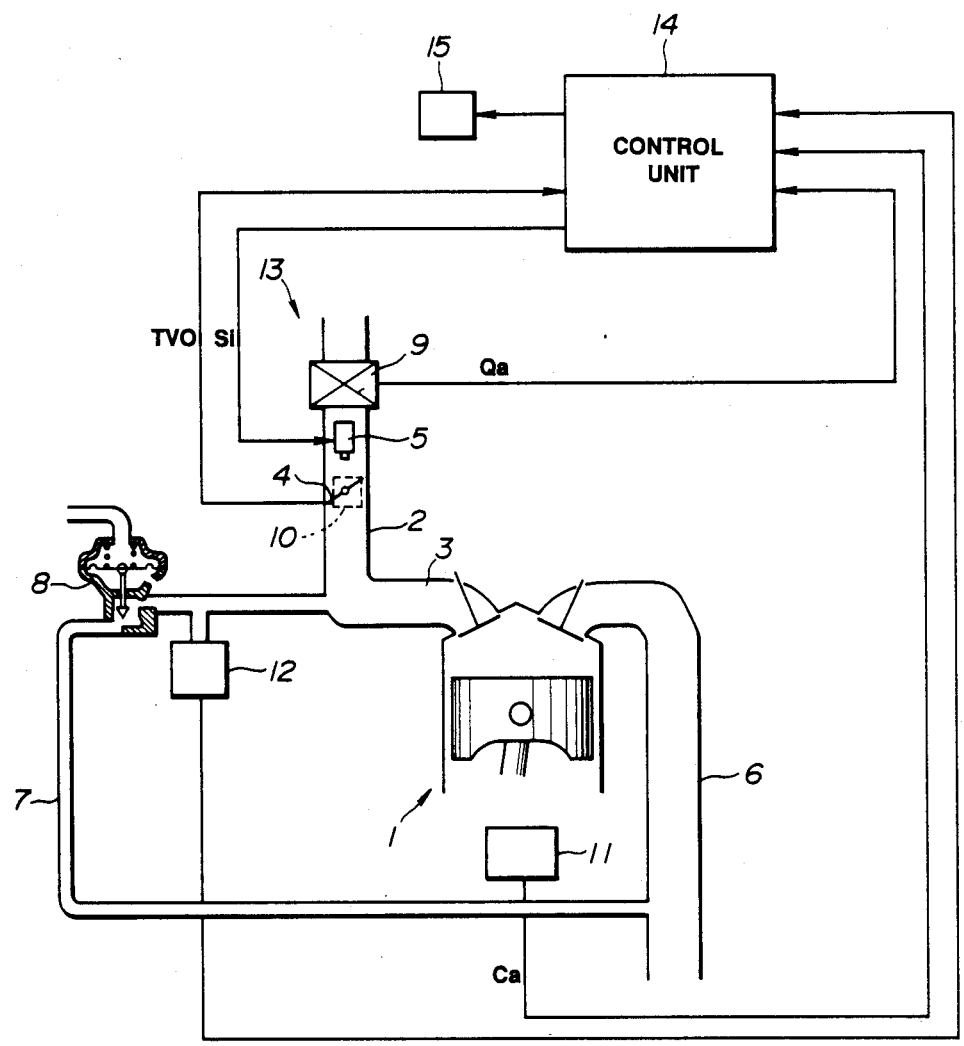
FIG. 1 is a simplified schematic diagram of an embodiment of an apparatus for diagnosing an EGR system acccording to the present invention.

Referring first to FIG. 1, an exhaust gas recirculation (EGR) system is shown in association with an internal combustion engine 1 which is provided with an intake system including an intake conduit 2 and also with an exhaust system including an exhaust conduit 6. Intake air taken through the intake conduit 2 and an intake manifold 3 and fuel injected in connection with an injection signal Si from a single injector 5 mounted on upstream of a throttle valve 4 are supplied into each of cylinders of the engine 1. Exhaust gas resulting from combustion in each of the cylinders is introduced to the exhaust gas conduit 6 and then to catalytic converter (not shown) where noxious constituents are eliminated and thereafter discharged in the air. One end of the EGR passage 7 is connected with the exhaust gas conduit 6 while the other end with the intake manifold 3 through an EGR control valve 8 thereby to recirculate part of exhaust gas to the intake manifold 8.

A flow quantity $Qa$ of intake air is detected by a hot-wire air flow meter 9 and an opening TVO of the throttle valve 4 by a throttle valve opening sensor 1. A crank angle $Ca$ of the engine 1 is detected by a crank angle sensor 11 and a number N of revolutions of the engine 1 can be known by counting pulses corresponding to the crank angle $Ca$. Further, the temperature of EGR gas is detected by a temperature sensor (temperature detecting means) 12 disposed in the EGR passage 7.

The airflow meter 9 and the crank angle sensor 11 constitute a running condition detecting means 13. Outputs of the running condition detecting means 13, the throttle valve opening sensor 10 and the temperature sensor 12 are supplied to a control unit 14. The control unit 14 is a microcomputer based system which includes as usual an input-output control, a central processing unit (CPU), a read-only memory (ROM), and a random-access memory (RAM). In this control unit 14, there is performed a calculation. An alarm signal is outputted by the control unit 14 to an alarm lamp 15 when it is determined that the EGR system is in trouble. With the alarm lamp 15 turned on a driver is warned of a malfunction of the EGR system.

Figure 2:
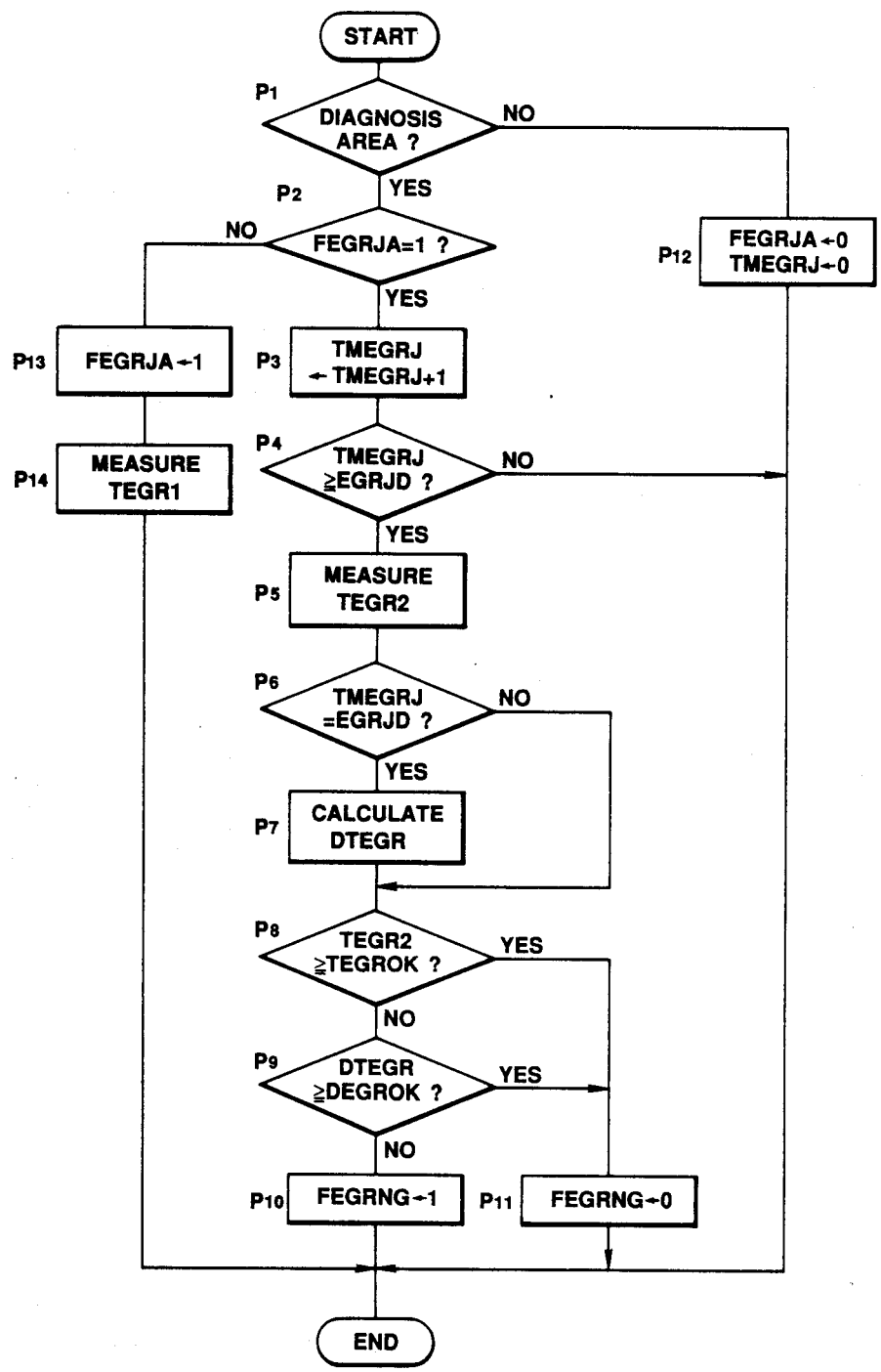
FIG. 2 is a flow chart of a program used to explain the operation of the apparatus.
Figure 3:
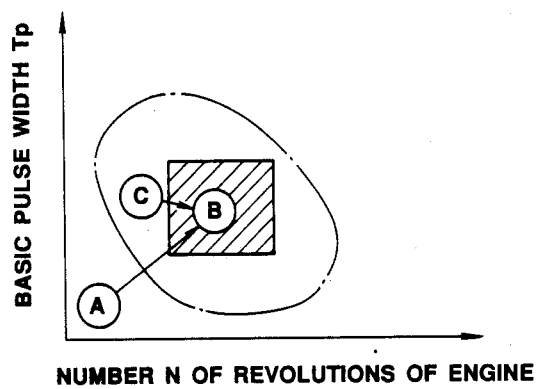
FIG. 3 is a diagram showing a diagnosis area in which the apparatus makes a diagnosis.
Figure 4:
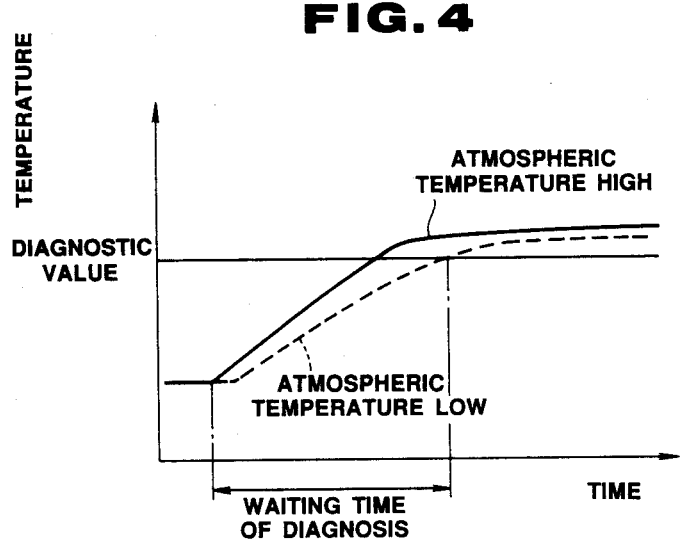
FIG. 4 is a diagram showing a waiting time during which the apparatus is dead.

Referring to a flow diagram shown in FIG. 2, the operation is described. The execution of this program is initiated after elapse of a predetermined period of time. First, in a step P1, it is judged whether or not the engine running condition is in a predetermined diagnosis area as illustrated by a shadowed area in FIG. 3. This judgment is made based on a basic pulse width Tp indicative of an engine load and a revolution speed N of the engine. When the engine running condition is in the predetermined area, the program proceeds to a step P2 where it is judged whether or not a diagnosis area flag FEGRJA is set (FEGRJA=1 ?). If FEGRJA is 1, representing that the engine running condition is in the predetermined area, the program proceeds to a step P3 where a diagnosis area timer TMEGRJ is increased by 1 (TMEGRJ←TMEGRJ+1). The content of the timer is indicative of the length of time during which the engine operates in this diagnosis area. In a step P4, the content of the timer TMEGRJ is compared with a predetermined waiting time EGRJD. If TMEGRJ is greater than or equal to EGRJD, it is judged that the predetermined waiting time has expired, and the program proceeds to a step P5 where the temperature of EGR gas TEGR2 is measured on the basis of an output of the temperature sensor 12. On the other hand, if TMEGRJ is less than EGRJD, the program comes to an end. In a step P6 subsequent to the step P5, it is judged whether or not TMEGRJ has become equal to EGRJD (TMEGR=EGRJD?). If TMEGR is EGRJD, the program proceeds to a step P7 where temperature rise rate DTEGR is calculated by the following formula on the basis of the temperatures of EGR gas TEGR2 measured at the present moment and TEGR1 measured at a step P14 as discussed below:

$$DTEGR = TEGR2 - TEGR1 \tag{1}$$

If TMEGRJ is not EGRJD, the program proceeds to a step P8 by passing the step P7.

In a step P8, it is judged whether or not the above-discussed TEGR2 is greater than or equal to a predetermined temperature TEGROK (TEGR2≧TEGROK?). If TEGR2 is less than TEGROK, it is judged at a step P9 whether or not DTEGR is greater than or equal to a predetermined value DEGROK (DTEGR≦DEGROK?). If DTEGR is less than DEGROK, a failure flag FEGRNG is set (FEGRNG=1) at a step P10 and the program comes to an end. On the other hand, if TEGR2 is greater than or equal to TEGROK, or DEGR is greater than or equal ro DEGROK, the failure flag FEGRNG is cleared (FEGRNG=0) at a step P11.

If engine running condition is not in the diagnosis area at the step P1, the diagnosis area flag FEGRJA and the diagnosis area timer TMEGRJ are cleared in the step P12 and the program comes to an end. When FEGRJA is not 1 in the step P2, it is judged that engine running condition falls in the diagnosis area, the diagnosis area flag FEGRJA is set (FEGRJA=1) at a step P13, the EGR gas temperature TEGR1 at the present moment is measured at a step P14 before the program comes to an end.

What is claimed is:

1. An apparatus for diagnosing an EGR system for an internal combustion engine, the EGR system including an EGR passage, the apparatus comprising:
    means for detecting whether running condition of the engine falls in a predetermined range of engine running conditions or not and generating a diagnosis area indicative signal when the running condition of the engine falls in said predetermined range;
    means for detecting a temperature within the EGR passage and generating a temperature indicative signal indicative of the temperature detected;

means responsive to said temperature indicative signal for determining a rise in said temperature indicative signal and generating a temperature rise indicative signal indicative of the rise detected;

means for determining whether said temperature indicative signal is lower than a first predetermined value or not and generating a first predetermined value indicative signal when said temperature indicative signal is lower than said first predetermined value;

means for determining whether said temperature rise indicative signal is lower than a second predetermined value or not and generating a second predetermined value indicative signal when said temperature rise indicative signal is lower than said second predetermined value; and means for determining the EGR system is in trouble when said first and second predetermined value indicative signals are present under a condition where said diagnosis area indicative signal is present.

2. A method of diagnosing an EGR system for an internal combustion engine, the EGR system including an EGR passage, the method comprising the steps of:

detecting whether running condition of the engine falls in a predetermined range of engine running conditions or not and generating a diagnosis area indicative signal when the running condition of the engine falls in said predetermined range;

detecting a temperature within the EGR passage and generating a temperature indicative signal indicative of the temperature detected;

determining a rise in said temperature indicative signal and generating a temperature rising indicative signal of the rise detected;

determining whether said temperature indicative signal is lower than a first predetermined value or not and generating a first predetermined value indicative signal when said temperature indicative signal is lower than said first predetermined value;

determining whether said temperature rise indicative signal is lower than a second predetermined value or not and generating a second predetermined value indicative signal when said temperature rise indicative signal is lower than said second predetermined value; and determining the EGR system is in trouble when said first and second predetermined value indicative signals are present under a condition where said diagnosis area indicative signal is present.

* * * * *